(12) United States Patent
Lin et al.

(10) Patent No.: US 11,574,142 B2
(45) Date of Patent: Feb. 7, 2023

(54) SEMANTIC IMAGE MANIPULATION USING VISUAL-SEMANTIC JOINT EMBEDDINGS

(71) Applicant: Adobe Inc., San Jose, CA (US)

(72) Inventors: Zhe Lin, Fremont, CA (US); Xihui Liu, Hong Kong (CN); Quan Hung Tran, San Jose, CA (US); Jianming Zhang, Campbell, CA (US); Handong Zhao, San Jose, CA (US)

(73) Assignee: Adobe Inc., San Jose, CA (US)

(*) Notice: Subject to any disclaimer, the term of this patent is extended or adjusted under 35 U.S.C. 154(b) by 93 days.

(21) Appl. No.: 16/943,511

(22) Filed: Jul. 30, 2020

(65) Prior Publication Data

US 2022/0036127 A1 Feb. 3, 2022

(51) Int. Cl.
*G06K 9/62* (2022.01)
*G06T 11/00* (2006.01)
*G06V 10/44* (2022.01)

(52) U.S. Cl.
CPC ......... *G06K 9/6256* (2013.01); *G06K 9/6215* (2013.01); *G06K 9/6232* (2013.01); *G06T 11/00* (2013.01); *G06V 10/44* (2022.01)

(58) Field of Classification Search
None
See application file for complete search history.

(56) References Cited

U.S. PATENT DOCUMENTS

2004/0230802 A1\* 11/2004 Moon .................. H04N 19/467
713/176
2013/0301912 A1\* 11/2013 Mel ........................ G06T 5/003
382/162

OTHER PUBLICATIONS

Nam et al. "Text-Adaptive Generative Adversarial Networks: "Manipulating Images with Natural Language, 32nd Conference on Neural Information Processing Systems (NeurIPS 2018), Montreal, Canada (Year: 2018).\*
Frome, A., Corrado, G. S., Shlens, J., Bengio, S., Dean, J., Ranzato, M. A., & Mikolov, T. (2013). Devise: A deep visual-semantic embedding model. In Advances in neural information processing systems (pp. 2121-2129).
Faghri, F., Fleet, D. J., Kiros, J. R., & Fidler, S. (2017). Vse++: Improving visual-semantic embeddings with hard negatives. arXiv preprint arXiv:1707.05612.
(Continued)

*Primary Examiner* — Randolph I Chu
(74) *Attorney, Agent, or Firm* — Shook, Hardy & Bacon L.L.P.

(57) ABSTRACT

The technology described herein is directed to a reinforcement learning based framework for training a natural media agent to learn a rendering policy without human supervision or labeled datasets. The reinforcement learning based framework feeds the natural media agent a training dataset to implicitly learn the rendering policy by exploring a canvas and minimizing a loss function. Once trained, the natural media agent can be applied to any reference image to generate a series (or sequence) of continuous-valued primitive graphic actions, e.g., sequence of painting strokes, that when rendered by a synthetic rendering environment on a canvas, reproduce an identical or transformed version of the reference image subject to limitations of an action space and the learned rendering policy.

20 Claims, 16 Drawing Sheets

(56) References Cited

OTHER PUBLICATIONS

Chen, J., Shen, Y., Gao, J., Liu, J., & Liu, X. (2018). Language-based image editing with recurrent attentive models. In Proceedings of the IEEE Conference on Computer Vision and Pattern Recognition (pp. 8721-8729).
Mao, W., Lou, B., & Yuan, J. (2019). TunaGAN: Interpretable GAN for Smart Editing. arXiv preprint arXiv:1908.06163.
Fu, C., Hu, Y., Wu, X., Wang, G., Zhang, Q., & He, R. (2019). High fidelity face manipulation with extreme pose and expression. arXiv preprint arXiv:1903.12003.
Bau, D., Strobelt, H., Peebles, W., Zhou, B., Zhu, J. Y., & Torralba, A. (2020). Semantic photo manipulation with a generative image prior. arXiv preprint arXiv:2005.07727.
Bau, D., Zhu, J. Y., Strobelt, H., Zhou, B., Tenenbaum, J. B., Freeman, W. T., & Torralba, A. (2018). Gan dissection: Visualizing and understanding generative adversarial networks. arXiv preprint arXiv:1811.10597.
Xie, S., & Tu, Z. (2015). Holistically-nested edge detection. In Proceedings of the IEEE international conference on computer vision (pp. 1395-1403).
He, J., Zhang, S., Yang, M., Shan, Y., & Huang, T. (2019). Bi-directional cascade network for perceptual edge detection. In Proceedings of the IEEE Conference on Computer Vision and Pattern Recognition (pp. 3828-3837).
Gupta, S., & Mazumdar, S. G. (2013). Sobel edge detection algorithm. International journal of computer science and management Research, 2(2), 1578-1583.

\* cited by examiner

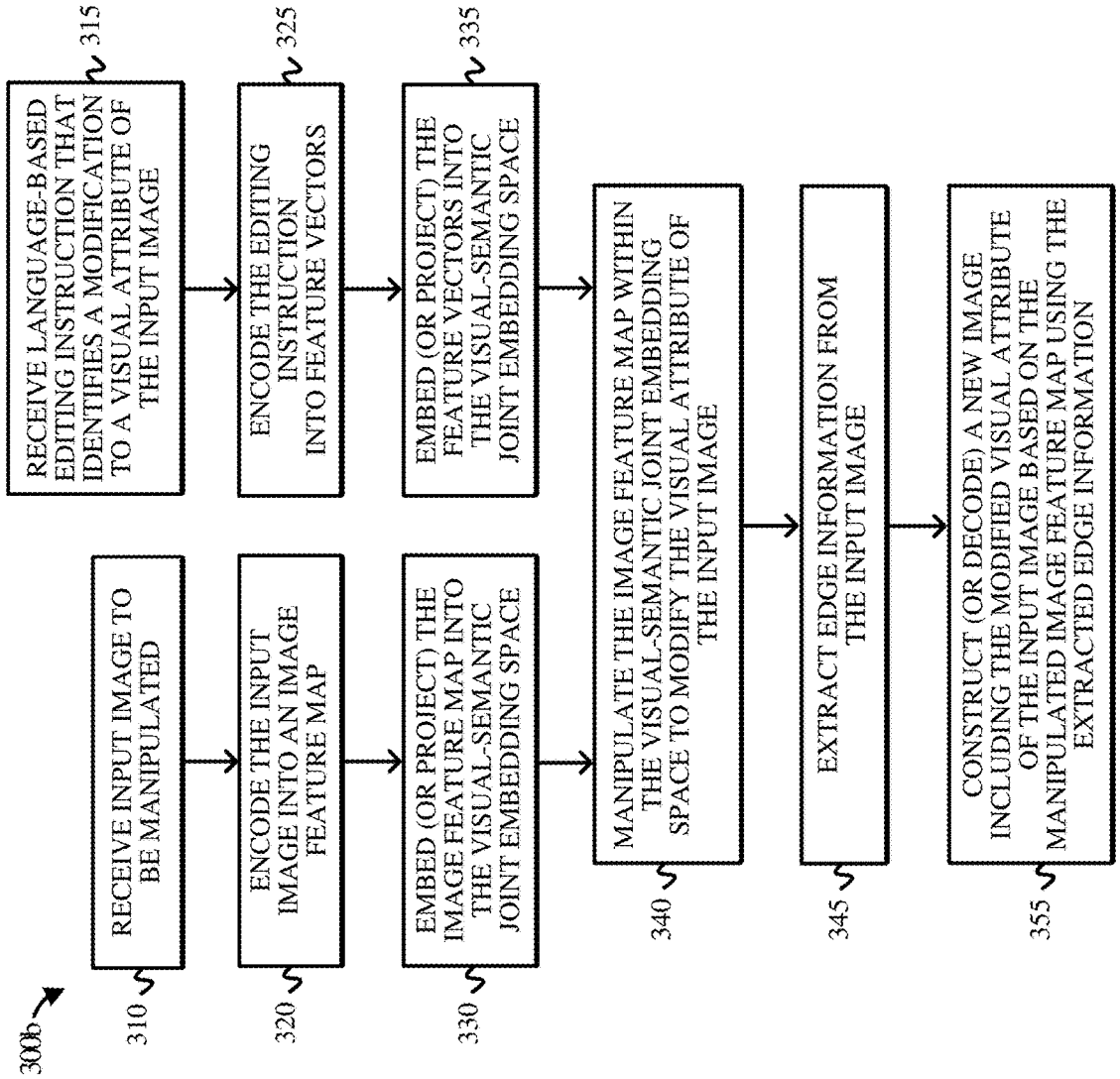

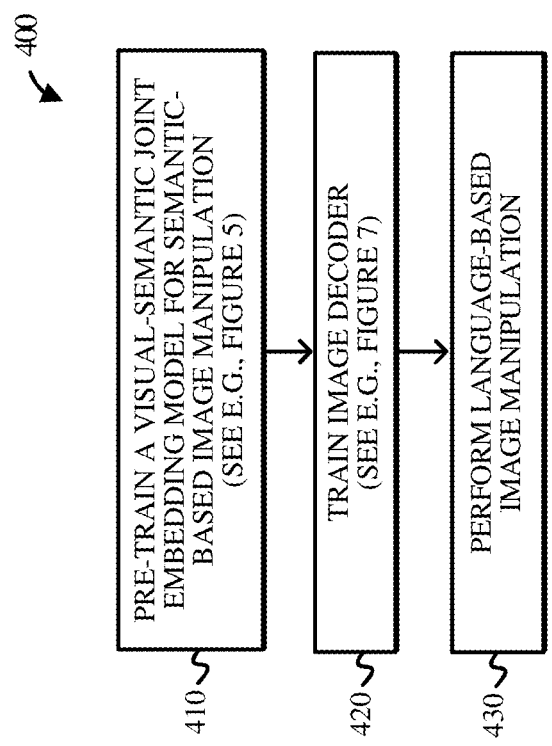

SEMANTIC IMAGE MANIPULATION USING VISUAL-SEMANTIC JOINT EMBEDDINGS

TECHNICAL FIELD

Aspects of the disclosure are related to the field of machine learning and artificial intelligence, and in particular, to open-vocabulary, unsupervised semantic image manipulation using visual-semantic joint embeddings.

BACKGROUND

Semantic image manipulation aims to generate realistic images from a source image and a text description such that the generated images match the content of the text description while simultaneously maintaining text-irrelevant features of the source image. Indeed, semantic image manipulation attempts to manipulate the source image based on the text relevant features identified in the text description without manipulating text-irrelevant features of the source image that are not identified in the text description. This manipulation typically requires a system that is able to learn a suitable mapping between visual and linguistic features.

Current semantic image manipulation techniques have explored various methods for editing images using generative adversarial networks (GANs). For example, current techniques have explored language-based image editing with recurrent attentive models, attempted to edit images according to high-level instructions based on StyleGAN generators, etc. Unfortunately, these approaches have various drawbacks. Most notably, current semantic image manipulation approaches are notoriously unreliable. More specifically, current semantic image manipulation techniques are unable to reliably manipulate a source image based on text relevant features identified in a text description without manipulating text-irrelevant features of the source image that are not identified in the text description. Moreover, current semantic image manipulation techniques can only generate images of limited resolution that tend to lack fine and clear details.

Furthermore, current semantic image manipulation techniques suffer additional deficiencies. For example, current techniques utilize closed vocabulary systems that require a unique model for each image attribute (or feature). Unfortunately, the number of required models is burdensome as each unique model needs to be individually trained, maintained, and properly deployed to achieve reliable semantic image manipulation. Indeed, current semantic image manipulation techniques require training data for each possible outcome to properly train a model for each image attribute (or feature). Additionally, current semantic image manipulation techniques require paired data, i.e., language instruction, original image, image after editing, for training. Generating and/or otherwise obtaining this training (or paired) data can be extremely burdensome and resulting in models that are not properly (or fully) trained.

SUMMARY

One or more embodiments described herein, among other benefits, solve one or more of the foregoing or other problems in the art by providing systems, methods, and non-transitory computer readable media for unsupervised semantic image manipulation using visual-semantic joint embeddings. In some implementations, the technology described includes one or more computer readable storage media having a semantic image manipulation agent stored thereon. The semantic image manipulation agent includes program instructions that, when executed by one or more processors, direct the one or more processors to encode a language-based editing instruction into textual feature vectors. The language-based editing instruction identifies a modification to a visual attribute of an input image. The program instructions that, when executed by one or more processors, further direct the one or more processors to embed the textual feature vectors into a visual-semantic joint embedding space, manipulate an image feature map corresponding to the input image based on the textual feature vectors to modify the visual attribute of the input image within the visual-semantic joint embedding space, and construct a new image from the manipulated image feature map using an image decoder.

In some implementations, the technology described includes a method of performing unsupervised open-vocabulary semantic image manipulation. The method includes receiving an input image to be manipulated and a language-based editing instruction identifying a modification to a visual attribute of the input image, encoding, using an image encoder, the input image into an image feature map, encoding, using a text encoder, a language-based editing instruction into textual feature vectors. The textual feature vectors include a first textual feature vector corresponding to the visual attribute, and a second textual feature vector corresponding to the modification to the visual attribute. The method further includes embedding the image feature map and the textual feature vectors into a visual-semantic joint embedding space, generating a new image feature map that modifies the visual attribute of the input image by manipulating the image feature map by the textual feature vectors within the visual-semantic joint embedding space, and constructing, using an image decoder, a new image from the manipulated image feature map.

In some implementations, the technology described includes a semantic image manipulation system including a joint embedding model, one or more processors, and an image decoder. The joint embedding model includes an image encoder, an image projection component, a text encoder, and a text projection component. The image encoder is configured to encode an input image into an image feature map. The image projection component configured to embed the image feature map into a visual-semantic joint embedding space. The text encoder configured to encode a language-based editing instruction into textual feature vectors, wherein the language-based editing instruction identifies a modification to a visual attribute of the input image. The text projection component configured to embed the textual feature vectors into a visual-semantic joint embedding space. The one or more processors are configured to manipulate the image feature map corresponding to the input image based on the textual feature vectors to modify the visual attribute of the input image within the visual-semantic joint embedding space. The image decoder is configured to decode the image feature map in the visual-semantic embedding space into a new image.

Additional features and advantages of the present application will be set forth in the description which follows, and in part will be obvious from the description, or may be learned by the practice of such example embodiments.

BRIEF DESCRIPTION OF THE DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not to be considered as limiting of its scope, implementations will be described and explained with additional specificity and detail through the use of the accompanying drawings.

FIGS. 3A and 3B depict flow diagrams illustrating example semantic image manipulation processes, according to some implementations.

FIG. 4 depicts a flow diagram illustrating an example training process for training a semantic image manipulation agent to perform semantic image manipulation using visual-semantic joint embeddings, according to some implementations.

Figure 1A:
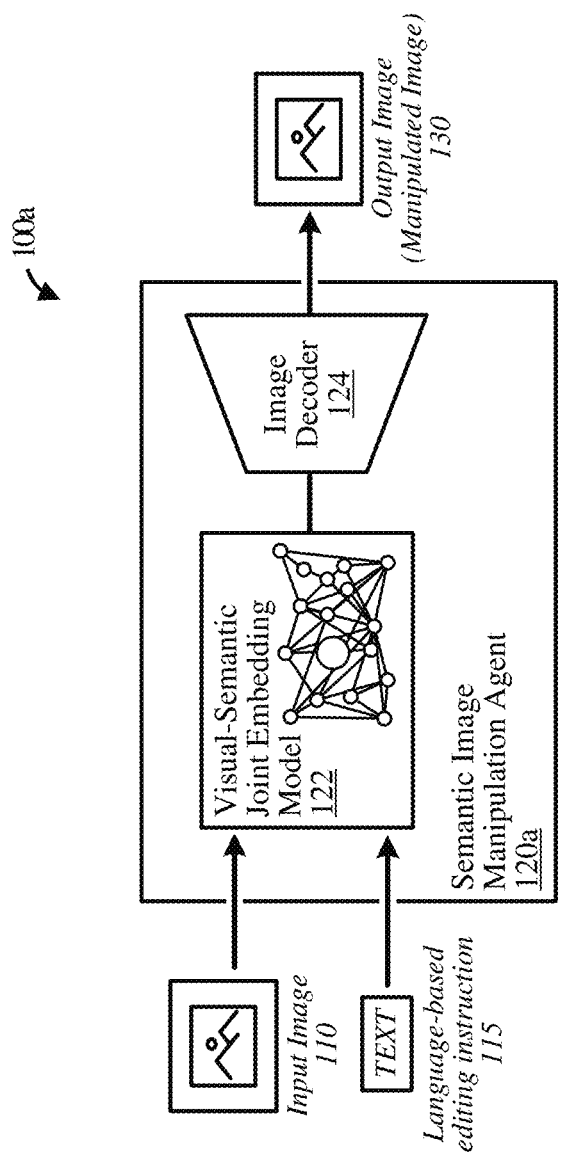
FIG. 1A depicts a block diagram illustrating an example image manipulation framework including a semantic image manipulation agent for performing open-vocabulary, unsupervised semantic image manipulation using visual-semantic joint embeddings, according to some implementations.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may include machine-implemented methods, computing devices, or computer readable medium.

The technology described herein is directed to a general framework for semantic image manipulation using visual-semantic joint embeddings. More specifically, the general framework feeds an input image and a language-based editing instruction that identifies a modification to a visual attribute (or feature) of the input image to a semantic image manipulation agent. The semantic image manipulation agent encodes the input image and the language-based editing instruction and embeds corresponding visual and textual information into a joint visual-semantic embedding space. The semantic image manipulation agent can then manipulate the identified visual attribute (or feature) of the input image by the textual information and decode (or construct) a new image containing the manipulated visual attribute while simultaneously maintaining text-irrelevant features of the input image. Because the visual and textual information are embedded in a common space, arbitrary attributes of the input images can be manipulated enabling reliable, open-vocabulary semantic image manipulation.

In some implementations, the semantic image manipulation agent described herein constructs a new image that reliably manipulates an input image based on text relevant attributes (or features or objects contained within the input image) identified by a language-based editing instruction without manipulating text-irrelevant features of the source image that are not identified by the language-based editing instruction. For example, the semantic image manipulation agent can receive an input image depicting a green apple with a language-based instruction indicating a modification of the color of the apple from green to red. The semantic image manipulation agent can generate a new image where the green apple is replaced by a red apple. Likewise, the semantic image manipulation agent can receive an input image depicting a sunny landscape with a language-based instruction indicating a modification of the landscape from sunny to cloudy. The semantic image manipulation agent can generate a new image where the sunny landscape g is replaced by the cloudy landscape.

In some implementations, the semantic image manipulation agent disclosed herein includes an edge extractor for preserving details of an input image by introducing edge constraints. The edge extractor extracts and feeds edge information (or edges) from an input image to an image decoder with a spatially conditioned batch normalization layer. As discussed herein, the edge extractor can be a neural network-based edge extractor, a Sobel edge extractor, or some other type of edge extractor, including combinations or variations thereof.

Various technical effects are enabled by the techniques discussed herein. Among other benefits, the semantic image manipulation agent disclosed herein utilizes a joint (or common) visual-semantic embedding space to facilitate open-vocabulary semantic image manipulation. Indeed, the joint (or common) visual-semantic embedding space enables accurate and reliable manipulation of arbitrary visual features of an input image by language-based editing instructions using a single visual-semantic joint embedding model.

Advantageously, the single visual-semantic joint embedding model enables open-vocabulary semantic image manipulation by eliminating the need to provide a unique model for every visual attribute (or feature). Utilizing a visual-semantic joint embedding model eliminates the need to train, maintain and properly deploy multiple models. Furthermore, training the semantic image manipulation model discussed herein is drastically simplified as the training does not require paired data, i.e., language instruction, original image, image after editing, for training. Rather, the visual-semantic joint embedding model discussed herein is trained with widely available image-caption pairs, e.g., from stock datasets. Additionally, the semantic image manipulation techniques discussed herein can further improve quality of the manipulations by preserving details of the images through the use of edge constraints.

As used herein, the term "semantic" refers to the meaning of a word, phrase, sentence, or text. For example, the semantic input references a change to an attribute (or feature) of the source image. The term "semantic image manipulation" refers to the process of manipulating a source image based on the semantic input. For example, change a green apple to red apple, or from sunny to cloudy.

As used herein, the term "open-vocabulary" refers to a word list that is not limited or predefined. Rather, linguistic features including words, phrases, and topics (sets of semantically related words) are automatically determined from the texts, i.e., the vocabulary is "data-driven."

As used herein, the term "neural network" (or artificial neural network) refers to a machine-learning model that can be tuned (e.g., trained) to approximate unknown functions. In particular, the term "neural network" can include a model of interconnected digital neurons that communicate and learn to approximate complex functions and generate outputs based on a plurality of inputs provided to the model. For instance, the term "neural network" includes one or more machine learning algorithms. In other words, a neural network is an algorithm that implements learning techniques, i.e., machine learning that utilizes a set of algorithms to attempt to model high-level abstractions in data.

Similarly, the term "deep neural network" refers to an artificial neural network with multiple layers between the input and output layers. A deep neural network finds the correct mathematical manipulation to turn the input into the output, whether it be a linear relationship or a non-linear relationship. The network moves through the layers calculating the probability of each output. Each mathematical manipulation as such is considered a layer, and complex deep neural networks can have many layers.

A general overview and architecture of an example image manipulation framework for semantic image manipulation using visual-semantic joint embeddings is described in relation to FIG. 1A. A more detailed example image manipulation framework including an edge extractor for preserving details of input images by introducing edge constraints is then described in relation to FIG. 1B. Thereafter, a more detailed description of the components and processes of the image manipulation framework are provided in relation to the subsequent figures.

FIG. 1A depicts a block diagram illustrating an example image manipulation framework 100a including a semantic image manipulation agent for performing open-vocabulary, unsupervised semantic image manipulation using visual-semantic joint embeddings, according to some implementations. As shown in the example of FIG. 1A, the image manipulation framework 100a includes an input image 110, a language-based editing instruction 115, a semantic image manipulation agent 120a, an image decoder 124, and an output image 130. The semantic image manipulation agent 120a includes a visual-semantic joint embedding model 122 and an image decoder 124.

Initially, the semantic image manipulation agent 120a is trained. As discussed herein, training the semantic image manipulation agent 120a includes first training the visual-semantic joint embedding model 122 and then fixing the visual-semantic joint embedding model 122 to train the image decoder 124. Once trained, the image decoder 124 can decode one or more modified image feature maps in a visual-semantic joint embedding space into a new output image 130. An example process illustrating agent training is shown and discussed in greater detail with reference to FIG. 4.

In some implementations, the visual-semantic joint embedding model 122 can be trained with image-caption pairs. Indeed, each image-caption pair can be a standard image-caption pair, e.g., obtained from stock or standard datasets, including a training image and a description of the training image. An example image-caption pair is shown and discussed in greater detail with reference to FIG. 6B. Advantageously, paired data, i.e., language instruction, original image, and image after editing, is not required for training the visual-semantic joint embedding model 122. An example illustrating the process for training a visual-semantic joint embedding model is shown and discussed in greater detail with reference to FIG. 5.

In some implementations, the image decoder 124 is trained by fixing the visual-semantic joint embedding model 122, feeding training images to the trained visual-semantic joint embedding model 122, reconstructing the training images using the image decoder 124, comparing the original and reconstructed training images to determine differences (or a loss), and providing feedback (e.g., the loss) to the image decoder 124 for iterative training. As discussed herein, iterative training can include adjusting one or parameters (or variables) of the image decoder 124 via back propagation in an attempt to more closely replicate training images during future iterations of the decoder training process.

Once the visual-semantic joint embedding model 122 is trained, the semantic image manipulation agent 120a can perform semantic image manipulation using visual-semantic joint embeddings. Indeed, once trained, the visual-semantic joint embedding model 122 includes a visual-semantic joint embedding space for jointly embedding image feature maps and text embeddings. As discussed herein, the visual-semantic joint embedding space enables the semantic manipulation. An example visual-semantic joint embedding space is shown and discussed in greater detail with reference to FIG. 2.

With a trained visual-semantic joint embedding model 122 and image decoder 124, the semantic image manipulation agent 120a performs semantic manipulation by changing visual features in the visual-semantic joint embedding space and then decoding a new image (output image 130) from the manipulated visual features. Indeed, as shown in the example of FIG. 1A, to perform semantic manipulation, the image manipulation framework 100a feeds an input image 110 and a language-based editing instruction 115 to the semantic image manipulation agent 120a. As discussed herein, the language-based editing instruction 115 identifies a modification to a visual attribute of the input image 110. For example, modify a green apple (in the input image) to a red apple or modify a sunny landscape (in the input image) to a cloudy landscape.

The semantic image manipulation agent 120a receives the input image 110 and the language-based editing instruction 115 and responsively provides these inputs to the visual-semantic joint embedding model 122. As discussed in more detail with reference to FIG. 2, the visual-semantic joint embedding model 122 encodes the input image 110 into one or more image feature map(s) and the language-based editing instruction 115 into textual feature vectors (or text embeddings). The semantic image manipulation agent 120a embeds the one or more image feature map(s) and the textual feature vectors (or text embeddings) into the visual-semantic joint embedding space.

Once the one or more image feature map(s) and the textual feature vectors (or text embeddings) are embedded in the visual-semantic joint embedding space, the semantic image manipulation agent 120a performs the semantic image manipulation by changing (or manipulating) one or more visual attributes of the input image in the visual-semantic joint embedding space. Indeed, the semantic image manipulation agent 120a manipulates at least one of the one or more image feature maps corresponding to the input image based on the textual feature vectors (or text embeddings) to modify the visual attribute of the input image within the visual-semantic joint embedding space. Although the visual-semantic joint embedding space is not shown in the example of FIG. 1A, an example semantic image manipulation including a visual-semantic joint embedding space is shown and discussed in greater detail with reference to FIG. 2. In some implementations, to manipulate at least one of the one or more image feature maps corresponding to the input image based on the textual feature vectors (or text embeddings), the semantic image manipulation agent 120a manipulates the visual attribute (or feature) at each location using a manipulation rule.

As discussed herein, the joint visual-semantic embedding space is a common space which enables reliable, open-vocabulary semantic image manipulation. Indeed, because the visual and textual information are embedded in a common space, i.e., the joint visual-semantic embedding space, arbitrary attributes of the input images can be manipulated with language-based editing instructions (or target text descriptions).

The semantic image manipulation agent 120a feeds the manipulated feature map(s) to the image decoder 124 which, in turn, decodes (or constructs) a new image, i.e., output image 130 from the (or based on) manipulated feature map(s). As discussed herein the output image 130 is a manipulated version of input image 110. More specifically, the output image 130 comprises a version of the input image 110 that is manipulated based on text relevant attributes (or features) identified in the language-based editing instruction 115 without manipulation (or changes) to text-irrelevant features of the input image 110 that are not identified in the language-based editing instruction 115.

In some implementations, the image decoder 124 can include a neural network-based decoder such as, for example, a convolutional neural network (CNN)-based decoder, a recurrent neural network (RNN)-based decoder, or other deep neural networks configured to construct output image 130 from manipulated feature maps, including combinations or variations thereof.

Figure 12:
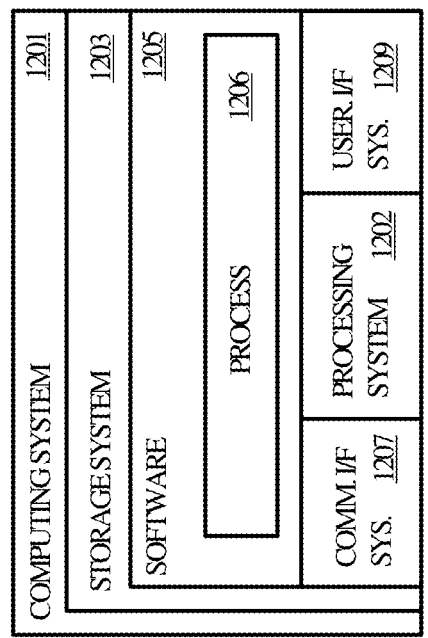
FIG. 12 depicts a block diagram illustrating an example computing system suitable for implementing the technology disclosed herein, including any of the applications, architectures, elements, processes, and operational scenarios and sequences illustrated in the Figures and discussed below in the Technical Disclosure.

One or more components of the image manipulation framework 100 can include or be executed on any system or collection of systems configured to perform the actions discussed herein. The system or collection of systems may include a smartphone, desktop computer, laptop computer, server computers, blade servers, rack servers, and any other type of computing system (or collection thereof), including combinations or variations thereof, suitable for executing the semantic image manipulation agent 120a to perform semantic image manipulation and/or otherwise carrying out the operations discussed herein. Such systems may employ one or more virtual machines, containers, or any other type of virtual computing resource in the context of improving application performance orchestration on a platform of which computing system 1201 of FIG. 12 is representative.

Figure 1B:
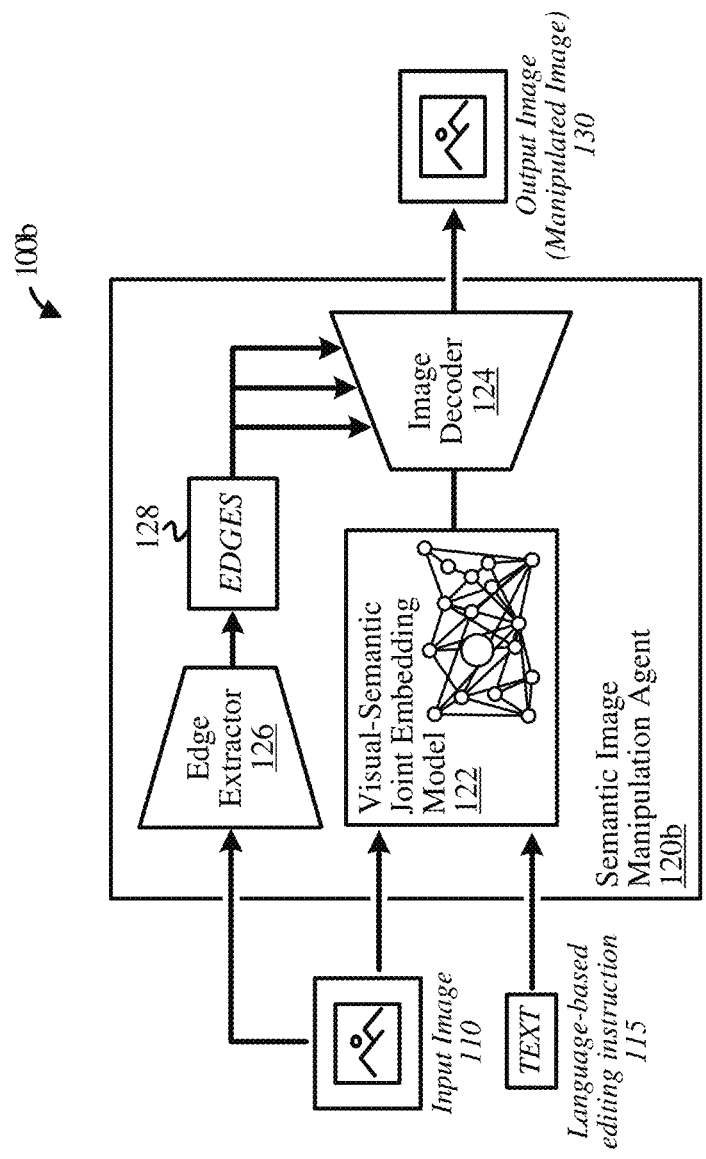
FIG. 1B depicts a block diagram illustrating an example image manipulation framework including another semantic image manipulation agent for open-vocabulary, unsupervised semantic image manipulation using visual-semantic joint embeddings, according to some implementations.

FIG. 1B depicts a block diagram illustrating an example image manipulation framework 100b including another semantic image manipulation agent 120b for open-vocabulary, unsupervised semantic image manipulation using visual-semantic joint embeddings, according to some implementations. The example image manipulation framework 100b includes the components of the example image manipulation framework 100a of FIG. 1A, but also includes an edge extractor 126 for preserving details of input images by introducing edge constraints.

More specifically, as shown in the example of FIG. 1B, the image manipulation framework 100b includes the input image 110, the language-based editing instruction 115, a semantic image manipulation agent 120b, the image decoder 124, and the output image 130. The semantic image manipulation agent 120b includes the visual-semantic joint embedding model 122, the image decoder 124, the edge extractor 126 and edges (or edge constraints) 128.

As discussed with reference to FIG. 1A, once the visual-semantic joint embedding model 122 is trained, the semantic image manipulation agent 120b can perform semantic image manipulation using visual-semantic joint embeddings. Indeed, once trained, the visual-semantic joint embedding model 122 includes a visual-semantic joint embedding space for jointly embedding image feature maps and text embeddings.

The edge extractor 126 is configured to extract edge information (or edges 128) of the input image 110. In some implementations, the edge extractor 126 can be a neural network-based edge extractor, a Sobel edge extractor, etc. Once extracted, the edge extractor 126 is further configured to feed the edge information (or edges 128) to the image decoder 124. In some implementations, the edge extractor 126 extracts edge information (or edges 128) of the input image 110 to feed the edge information (or edges 128) to the image decoder 124 with a spatially conditioned batch normalization layer.

Figure 2:
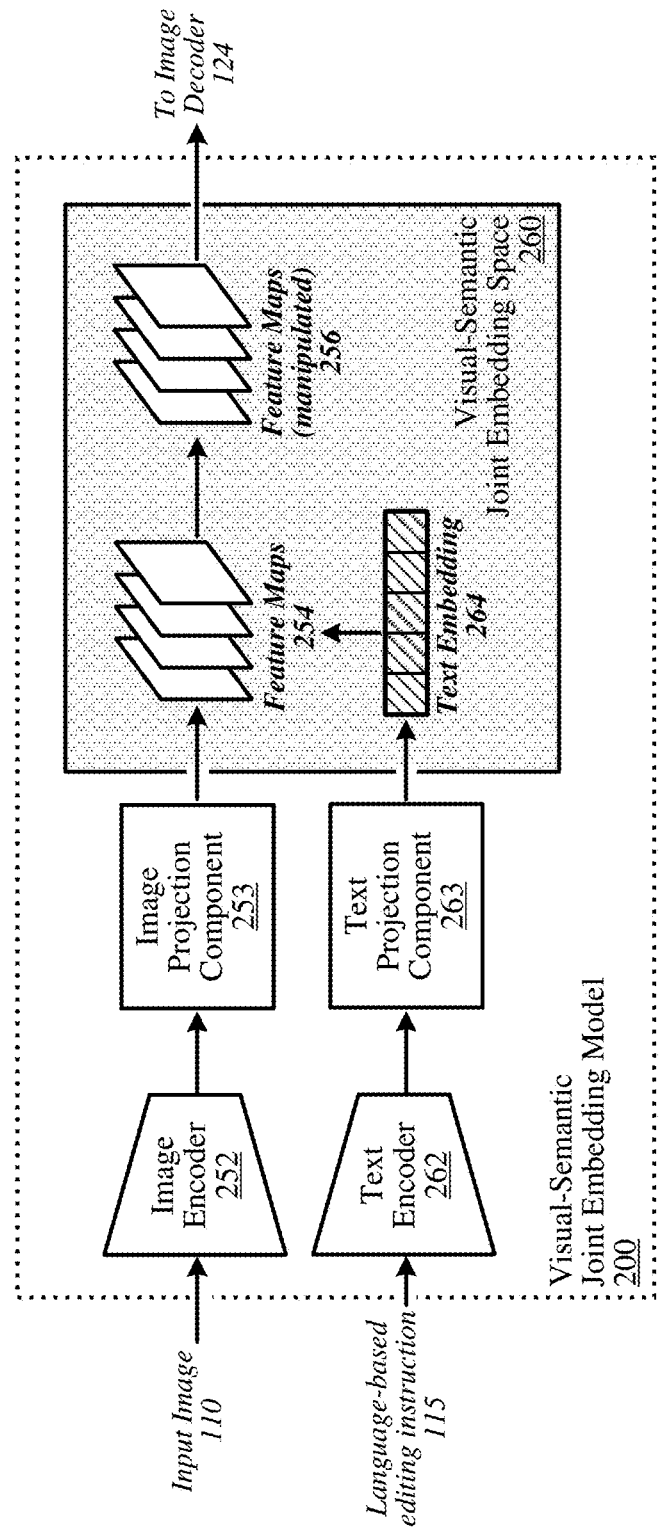
FIG. 2 depicts a block diagram illustrating example components of a visual-semantic joint embedding model including a (trained) visual-semantic joint embedding space for mapping and manipulating image feature maps according text embeddings, according to some implementations.

FIG. 2 depicts a block diagram illustrating example components of a visual-semantic joint embedding model 200 including a (trained) visual-semantic joint embedding space 260 for mapping and manipulating image feature maps according text embeddings, according to some implementations. The functions represented by the components, modules, managers and/or engines described with reference to FIG. 2 can be implemented individually or in any combination thereof, partially or wholly, in hardware, software, or a combination of hardware and software. Additionally, although illustrated as discrete components, the operation and functionality of the components, modules, managers and/or engines described with reference to FIG. 2 can be, partially or wholly, integrated within other components of the semantic image manipulation agent 120a of FIG. 1A or the semantic image manipulation agent 120b of FIG. 1B, although alternative configurations are possible.

As illustrated in the example of FIG. 2, the visual-semantic joint embedding model 200 includes an image encoder 252, an image projection component 253, a text encoder 262, a text projection component 263 and the visual-semantic joint embedding space 260. Other components or modules are also possible.

The image encoder 252 is configured to encode the input image 110 into one or more image feature map(s). For example, in some implementations, the image encoder 252 can encode the input image 110 into 20487×7 pixel feature maps. In some implementations, the image encoder 252 may be represented by or utilize a convolutional neural network (CNN) to encode the input image 110 into one or more image feature map(s).

The image projection component 253 is configured to embed (or project) the image feature map(s) into the visual-semantic joint embedding space 260. As shown in the example of FIG. 2, the embedded image feature map(s) are shown within the visual-semantic joint embedding space 260 as feature maps 254. In some implementations, the image projection component 253 is a one-by-one convolution layer that projects the image feature map(s) into the visual-semantic joint embedding space 260.

The text encoder 262 is configured to encode a language-based editing instruction 115 into textual feature vectors. As discussed herein, the language-based editing instruction 115 identifies a modification to a visual attribute (or feature) of the input image 110. In some implementations, the text encoder 262 may be represented by or utilize a long-short-term-memory network (LSTM) to encode sentences or phrases into textual feature vectors.

The text projection component 263 is configured to embed (or project) textual feature vectors into the visual-semantic joint embedding space 260. As shown in the example of FIG. 2, the embedded textual feature vectors are shown within the visual-semantic joint embedding space 260 as text embedding 264. In some implementations, the text projection component 263 is a fully connected layer that projects the textual feature vectors into the visual-semantic joint embedding space 260.

The visual-semantic joint embedding space 260 is configured provide a single space for jointly mapping image feature map(s) and textual feature vectors. More specifically, the joint visual-semantic embedding space 260 enables joint mapping of feature maps 254 and the text embedding 264 for reliable, open-vocabulary semantic image manipulation as text can be directly mapped to the corresponding image attributes (or features). Indeed, because the visual and textual information can be embedded in a common space, i.e., the joint visual-semantic embedding space 260, arbitrary attributes of the input images can be manipulated with the language-based editing instruction 115.

As discussed herein, the visual-semantic joint embedding model 200 is configured to manipulate one or more of the feature maps 254 based on the text embedding 264 resulting in modified (or manipulated) feature maps 256. In this manner, the visual-semantic joint embedding model 200 is able to modify the visual attribute of the input image 110 within the visual-semantic joint embedding space 260. In some implementations, the visual-semantic joint embedding model 200 manipulates the visual attribute (or feature) at each location using the manipulation rule shown in Equation 1:

$$V_{new} = V_{ori} - \alpha \langle V_{ori}, T_{ori} \rangle T_{ori} + \alpha \langle V_{ori}, T_{ori} \rangle T_{new} \quad \text{(Equation 1)}$$

where $V_{ori}$ is an attribute (or feature) of the input image 110 and $V_{new}$ is a new attribute (or feature) of an image after applying the manipulation. $T_{ori}$ is the original semantics and $T_{new}$ is the new semantics to be edited by the visual-semantic joint embedding model 200. For example, if the language-based editing instruction 115 is the instruction: "red apple=>green apple," than $T_{ori}$ is "green apple" and $T_{new}$ is "red apple." Furthermore, $\alpha$ is an adjustable constant indicating a level (or weight) that is applied to the manipulation, e.g., level that the visual-semantic joint embedding model 200 wants to modify an attribute (or feature) during the semantic image manipulation process. The modified (or manipulated) feature maps 256 are then provided to decoder 124 for decoding (or constructing) a new image.

Figure 3A:
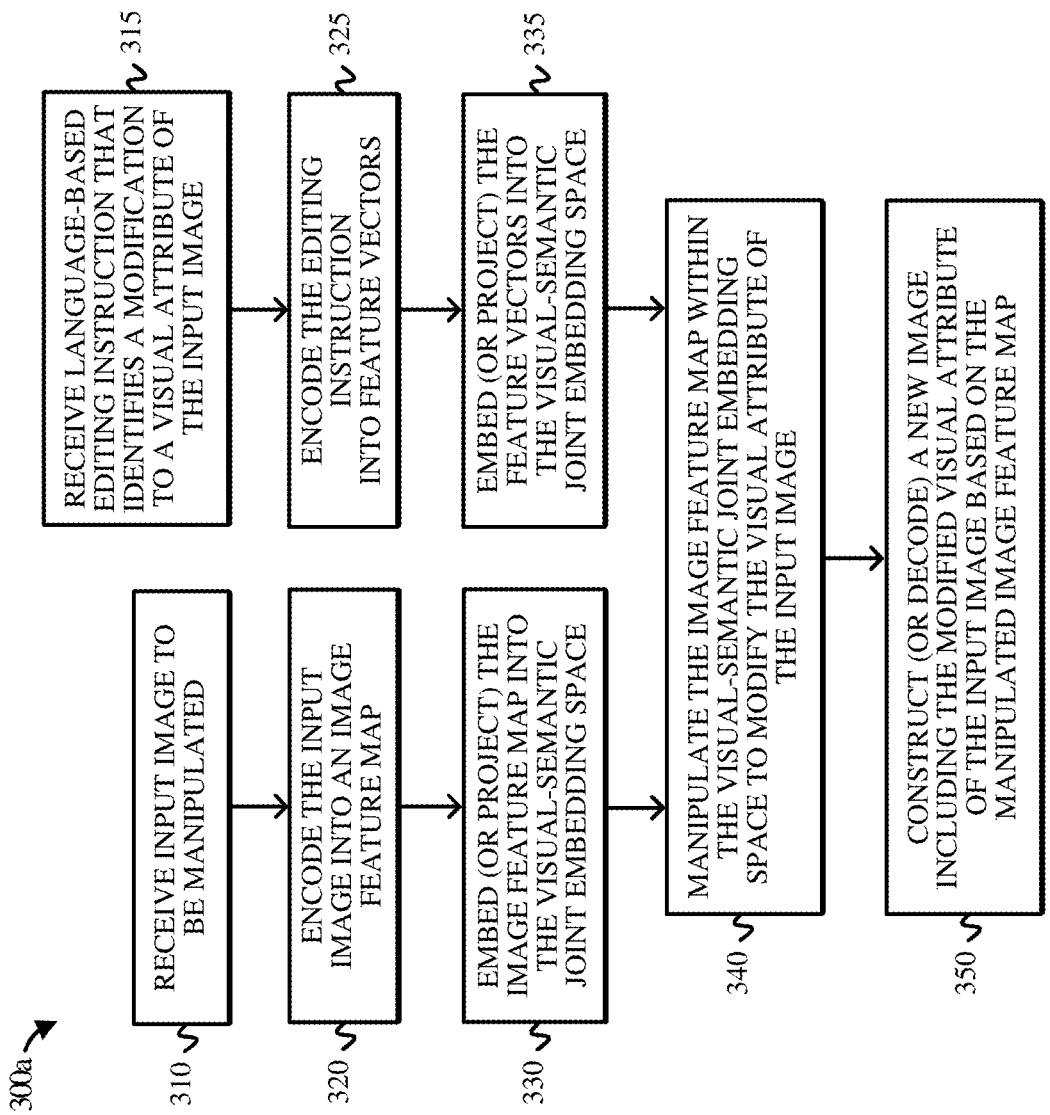

FIGS. 3A and 3B depict flow diagrams illustrating example semantic image manipulation processes 300a and 300b, respectively, according to some implementations. More specifically, the example semantic image manipulation processes 300a and 300b describe example techniques for semantic image manipulation without an edge extractor and with an edge extractor for preserving details of input images by introducing edge constraints, respectively.

Referring first to FIG. 3A, the example semantic image manipulation process 300a may be performed in various implementations by a semantic image manipulation agent such as, for example, semantic image manipulation agent 120a of FIG. 1A, or one or more processors, modules, engines, or components associated therewith.

To begin, at 310, the semantic image manipulation agent receives an input image to be manipulated and, at 315, a language-based editing instruction identifying a modification to a visual attribute of the input image. At 320, the semantic image manipulation agent encodes the input image into an image feature map using an image encoder and, at 325, encodes the language-based editing instruction into textual feature vectors. As discussed herein, the textual feature vectors can include a first textual feature vector corresponding to the visual attribute and a second textual feature vector corresponding to the modification to the visual attribute.

At 330, the semantic image manipulation agent embeds (or projects) the image feature map into a common visual-semantic joint embedding space and, at 335, embeds (or projects) the textual feature vectors into the same (common) visual-semantic joint embedding space. As discussed herein, the visual-semantic joint embedding space is configured provide a single space for jointly mapping image feature map(s) and textual feature vectors. More specifically, the joint visual-semantic embedding space enables mapping of both feature maps and the text embedding in the same space for reliable, open-vocabulary semantic image manipulation as text can be directly mapped to the corresponding image attributes (or features).

At 340, the semantic image manipulation agent manipulates the image feature map within the visual-semantic joint embedding space to modify the visual attribute of the input image. More specifically, the semantic image manipulation agent manipulates the image feature map by (or based on) the textual features vectors within the visual-semantic joint embedding space.

Lastly, at 350, the semantic image manipulation agent constructs (or decodes) a new (or output) image based on the manipulated image feature map. More specifically, the new image is a version of the input image that includes the modified visual attribute of the input image, i.e., text relevant attribute (or features) identified in the language-based editing instruction, without manipulating (or changing) other visual attributes of the input image, i.e., text-irrelevant attributes (or features of the input image) that are not identified in the language-based editing instruction.

Referring next to FIG. 3B, the example semantic image manipulation process 300b may be performed in various implementations by a semantic image manipulation agent such as, for example, semantic image manipulation agent 120b of FIG. 1B, or one or more processors, modules, engines, or components associated therewith. The example of FIG. 3B includes many steps discussed with respect to process 300a of FIG. 3A which are similarly labeled but not discussed again with respect to process 300b for brevity. Indeed, steps 310-340 are discussed with respect to process 300a of FIG. 3A. Process steps 345 and 355 related to operations of an edge extractor for preserving details of input images by introducing edge constraints are discussed in more detail below.

At 345, the semantic image manipulation agent extracts edge information from the input image. As discussed herein, an edge extractor can extract edges for preserving details of input images by introducing edge constraints.

Lastly, at 355, the semantic image manipulation agent constructs (or decodes) a new (or output) image based on the manipulated image feature map and the extracted edge information. More specifically, the new image is a version of the input image that includes the modified visual attribute of the input image, i.e., text relevant attribute (or features) identified in the language-based editing instruction, without manipulating (or changing) other visual attributes of the input image, i.e., text-irrelevant attributes (or features of the input image) that are not identified in the language-based editing instruction.

Various techniques can be utilized by an image decoder to introduce the edge information in the image construction process. In some implementations, a normalization method called SPatially-Adaptive (DE)normalizationl (SPADE) can be utilized. SPADE provides a simple but effective layer for synthesizing photorealistic images. For example, SPADE involves projecting an edge map onto an embedding space. The projected edge map is then convolved to produce modulation parameters, e.g., scale feature map and bias feature map. These modulation parameters are tensors with spatial dimensions. The modulation parameters are then multiplied and added to the manipulated feature map(s) elementwise.

FIG. 4 depicts a flow diagram illustrating an example training process 400 for training a semantic image manipulation agent to perform semantic image manipulation using visual-semantic joint embeddings, according to some implementations. The example training process 400 may be performed in various implementations by an open-vocabulary, unsupervised semantic image manipulation framework such as, for example, image manipulation framework 100a or 100b of FIGS. 1A and 1B, respectively, or one or more processors, modules, engines, or components associated therewith.

To begin, at 410, the semantic image manipulation framework pre-trains a visual-semantic joint embedding model for semantic-based image manipulation.

An example training process for pre-training a visual-semantic joint embedding model for semantic-based image manipulation is shown and discussed in greater detail with reference to FIG. 5.

Figure 5:
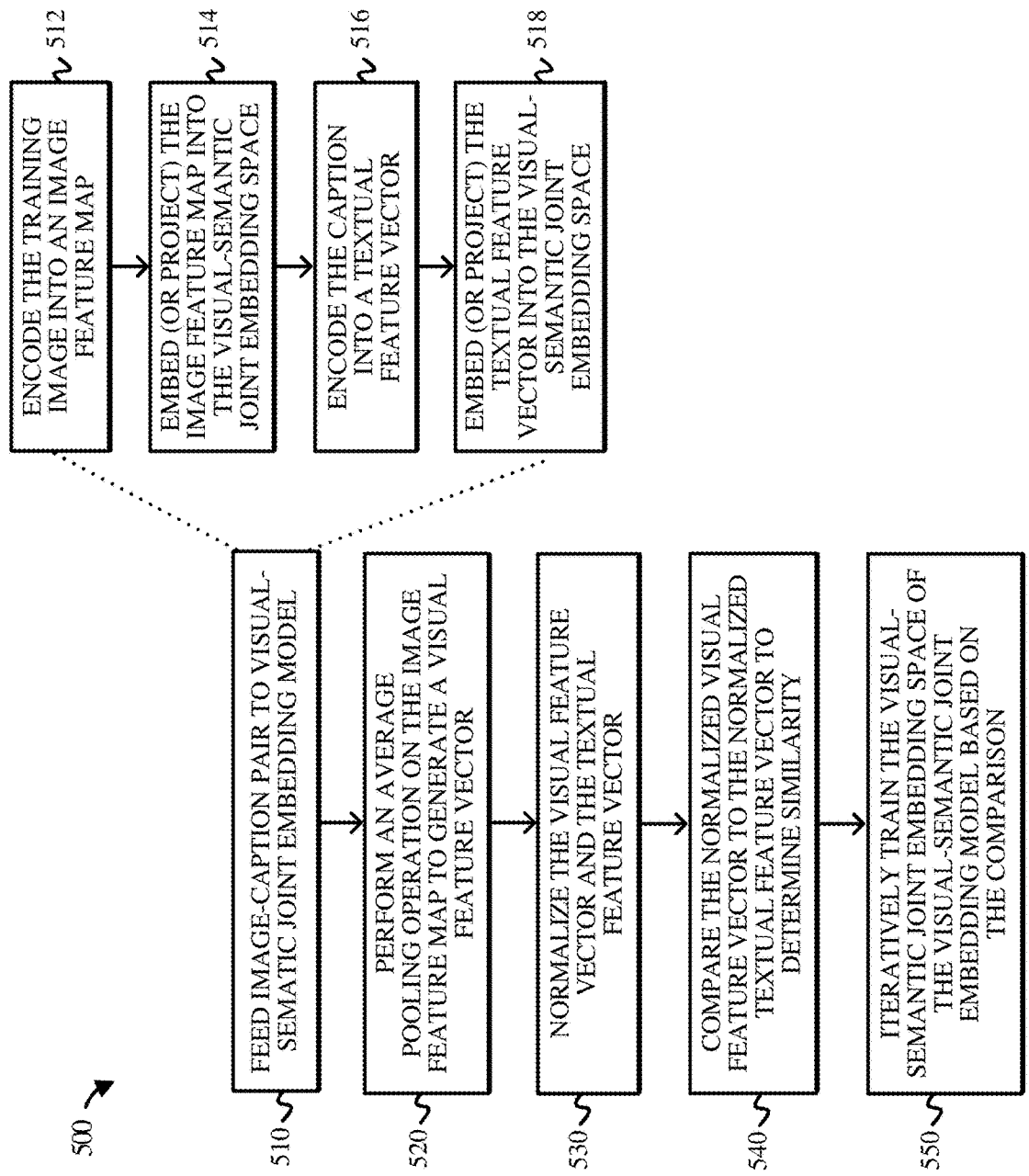
FIG. 5 depicts a flow diagram illustrating an example training process for pre-training a visual-semantic joint embedding model for semantic-based image manipulation, according to some implementations.

FIG. 5 depicts a flow diagram illustrating an example training process 500 for pre-training a visual-semantic joint embedding model for semantic-based image manipulation, according to some implementations. The example training process 500 may be performed in various implementations by an open-vocabulary, unsupervised semantic image manipulation framework such as, for example, image manipulation framework 100a or 100b of FIGS. 1A and 1B, respectively, or one or more processors, modules, engines, or components associated therewith.

To begin, at 510, the semantic image manipulation framework feeds an image-caption pair to a visual-semantic joint embedding model. In some implementations, to encode the training image into an image feature map, the semantic image manipulation framework and, more specifically, the visual-semantic joint embedding model being trained, encodes the training image into an image feature map (512), embeds (or projects) the image feature map into the visual-semantic joint embedding space (514), encodes the caption into a textual feature vector (516), and embed (or project) the textual feature vector.

At 520, the semantic image manipulation framework performs a pooling operation on the image feature map to generate a visual feature vector. As discussed herein, the pooling operation comprises an average pooling operation, however, other pooling operations are possible. At 530, the semantic image manipulation framework normalizes the visual feature vector and the textual feature vector. At 540, the semantic image manipulation framework then compares the normalized visual feature vector to the normalized textual feature vector to determine a similarity (or a similarity score). In some implementations, the visual-semantic joint embedding space can be trained with a bi-directional triplet ranking loss shown in Equation 2:

$$\ell_{MH}(i, c) = \max_{c'}[\alpha + s(i, c') - s(i, c)]_{+} + \max_{i'}[\alpha + s(i', c) - s(i, c)]_{+} \quad \text{(Equation 2)}$$

where (i,c) is any positive (corresponding) image-sentence pairs, (i, c') and (i', c) are negative (non-corresponding) image-sentence pairs. [x]+ denotes the operation of max (x, 0). The max operation selects the hardest negative pair for calculating loss.

Lastly, at 550, the semantic image manipulation framework iteratively trains the visual-semantic joint embedding space of the visual-semantic joint embedding model based on the calculated similarity (or similarity score).

Figure 6A:
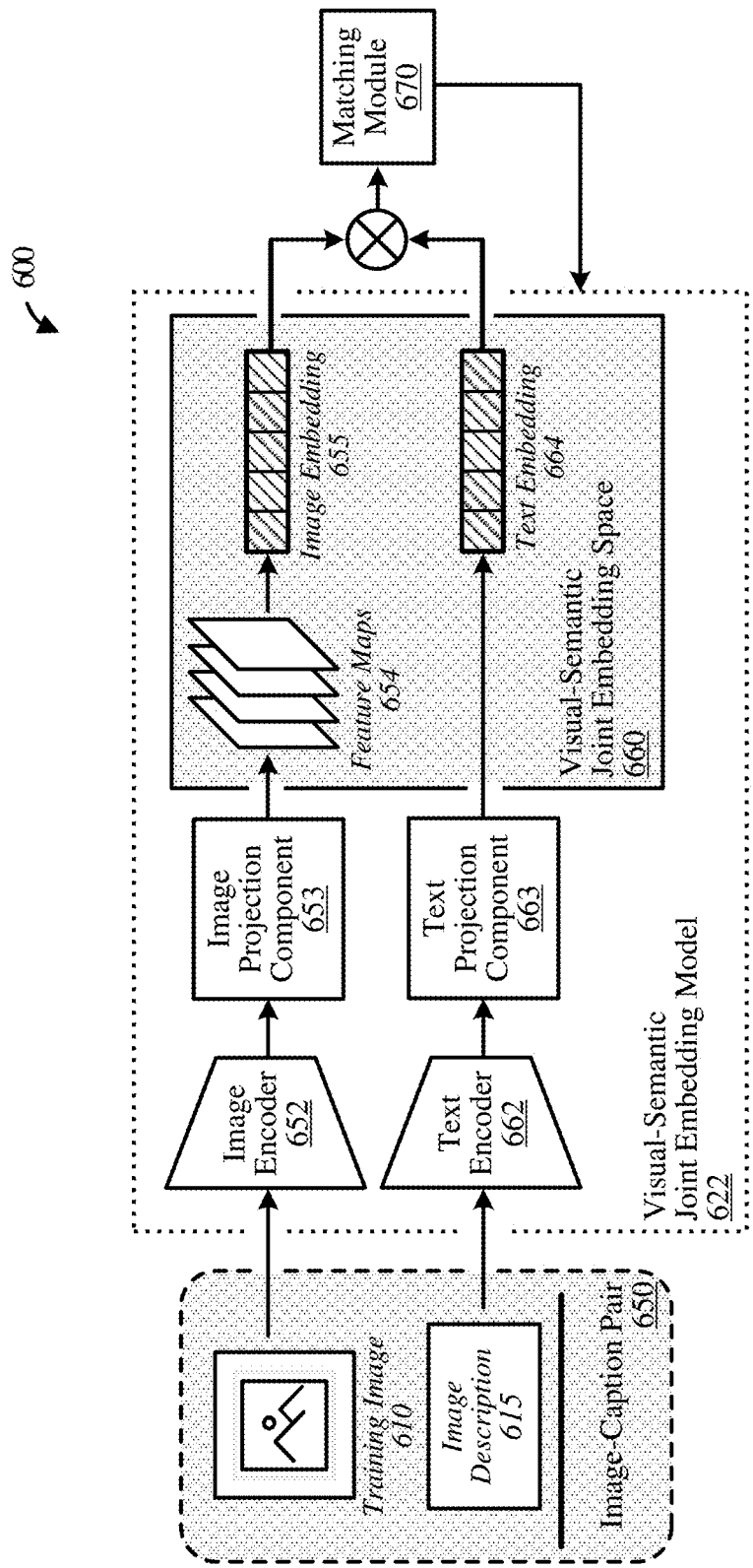
FIG. 6A depicts a block diagram illustrating an example training framework for training a visual-semantic joint embedding model for semantic image manipulation, according to some implementations.

FIG. 6A depicts a block diagram illustrating an example training framework 600 for training a visual-semantic joint embedding model 622 for semantic image manipulation, according to some implementations. More specifically, as shown in the example of FIG. 6A, the example image manipulation framework 600 iteratively trains a visual-semantic joint embedding space of the visual-semantic joint embedding model 622 for open-vocabulary, unsupervised semantic image manipulation using visual-semantic joint embeddings.

The functions represented by the components, modules, managers and/or engines described with reference to FIG. 6A can be implemented individually or in any combination thereof, partially or wholly, in hardware, software, or a combination of hardware and software. Additionally, although illustrated as discrete components, the operation and functionality of the components, modules, managers and/or engines described with reference to FIG. 6A can be, partially or wholly, integrated within other components of a semantic image manipulation agent such as, for example, semantic image manipulation agent 120a of FIG. 1A or the semantic image manipulation agent 120b of FIG. 1B, although alternative configurations are possible.

As shown in the example of FIG. 6A, the visual-semantic joint embedding model 622 includes an image encoder 652, an image projection component 653, a text encoder 662, a text projection component 663 and the visual-semantic joint embedding space 660. Other components or modules are also possible. The visual-semantic joint embedding model 622 can be visual-semantic joint embedding model 122 of FIG. 1A or 1B or visual-semantic joint embedding model 200 of FIG. 2, although alternative configurations are possible.

To train the visual-semantic joint embedding model 622 for semantic image manipulation, the example training framework 600 feeds an image-caption pair 650 to the visual-semantic joint embedding model 622. The image-caption pair 650 includes a training image 610 and an image description 615. As discussed herein, the image-caption pair 650 can be a standard image-caption pair, e.g., from a stock dataset, including a training image and a description of the training image. An example image-caption pair 650' is shown and discussed in greater detail with reference to FIG. 6B.

As discussed herein, the image encoder 652 encodes the training image 610 of the image-caption pair 650 into feature maps 654 that are projected into the visual-semantic joint embedding space 660 via the image projection component 653. Likewise, the text encoder 662 encodes the image description 615 into textual feature vectors that are projected into the visual-semantic joint embedding space 660 via the projection component 663 as text embedding 664. A pooling operation is performed on the image feature maps 654 to generate image embedding 655, e.g., a visual feature vector.

The matching module 670 normalizes and compares the image embedding 655 and the text embedding 664 to determine a similarity. The similarity then used to iteratively train the visual-semantic joint embedding space 660 of the visual-semantic joint embedding model 622.

Figure 6B:
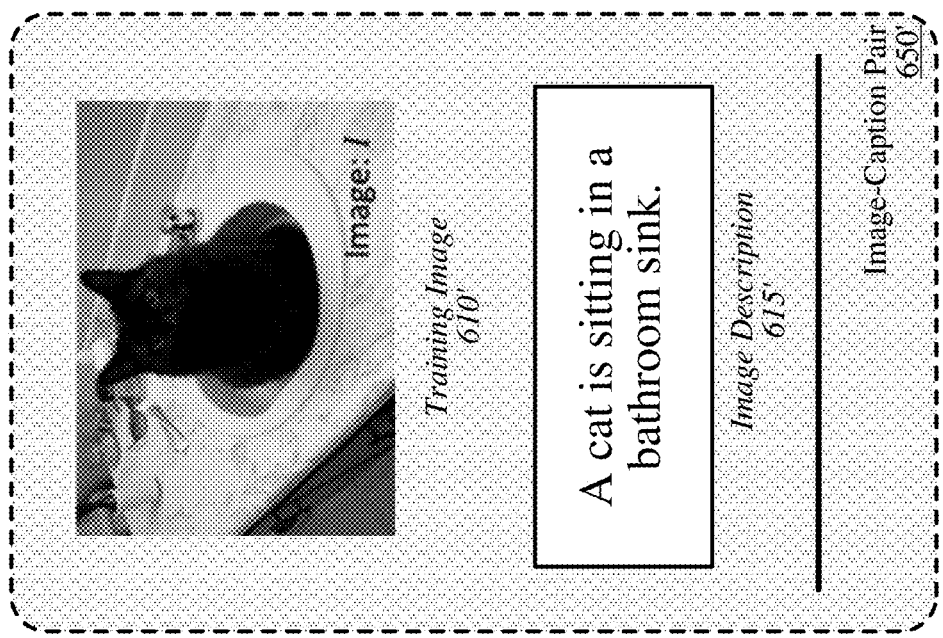
FIG. 6B depicts an example image-caption pair, according to some implementations.

FIG. 6B depicts an example image-caption pair 650', according to some implementations. More specifically, the example of FIG. 6B depicts a training image 610' depicting a black cat in a sink with a corresponding image description 615' "A cat is sitting in a bathroom sink."

Figure 7:
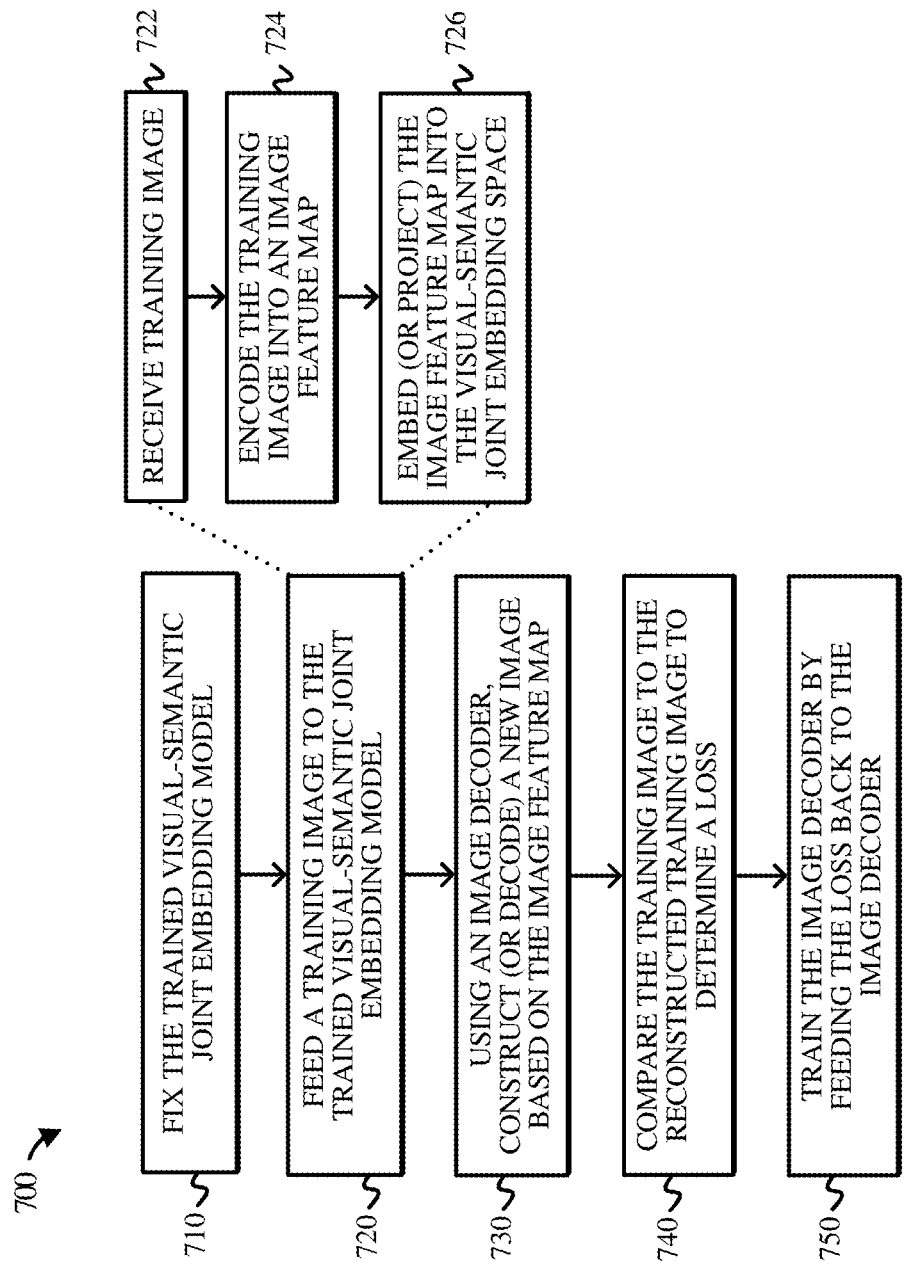
FIG. 7 depicts a flow diagram illustrating an example decoder training process for training an image decoder, according to some implementations.

FIG. 7 depicts a flow diagram illustrating an example decoder training process 700 for training an image decoder, according to some implementations. The example decoder training process 700 may be performed in various implementations by an open-vocabulary, unsupervised semantic image manipulation framework such as, for example, image manipulation framework 100a or 100b of FIGS. 1A and 1B, respectively, or one or more processors, modules, engines, or components associated therewith.

To begin, at 710, the semantic image manipulation framework fixes the trained visual-semantic joint embedding model. Once fixed, at 720, the semantic image manipulation framework feeds training image to the trained visual-semantic joint embedding model. In some implementations, to feed the training image to the trained visual-semantic joint embedding model, the semantic image manipulation framework receives the training image (722), encodes the training image into an image feature map (724), and then embeds (or projects) the image feature map into the visual-semantic joint embedding space (726).

At 730, the semantic image manipulation framework constructs, using an image decoder, a new image from the manipulated image feature map. At 740, the semantic image manipulation framework compares the training image to the new image (the reconstructed image) to determine a loss. Lastly, at 750, the semantic image manipulation framework trains the image decoder by feeding the loss to the image decoder for training.

Figure 8A:
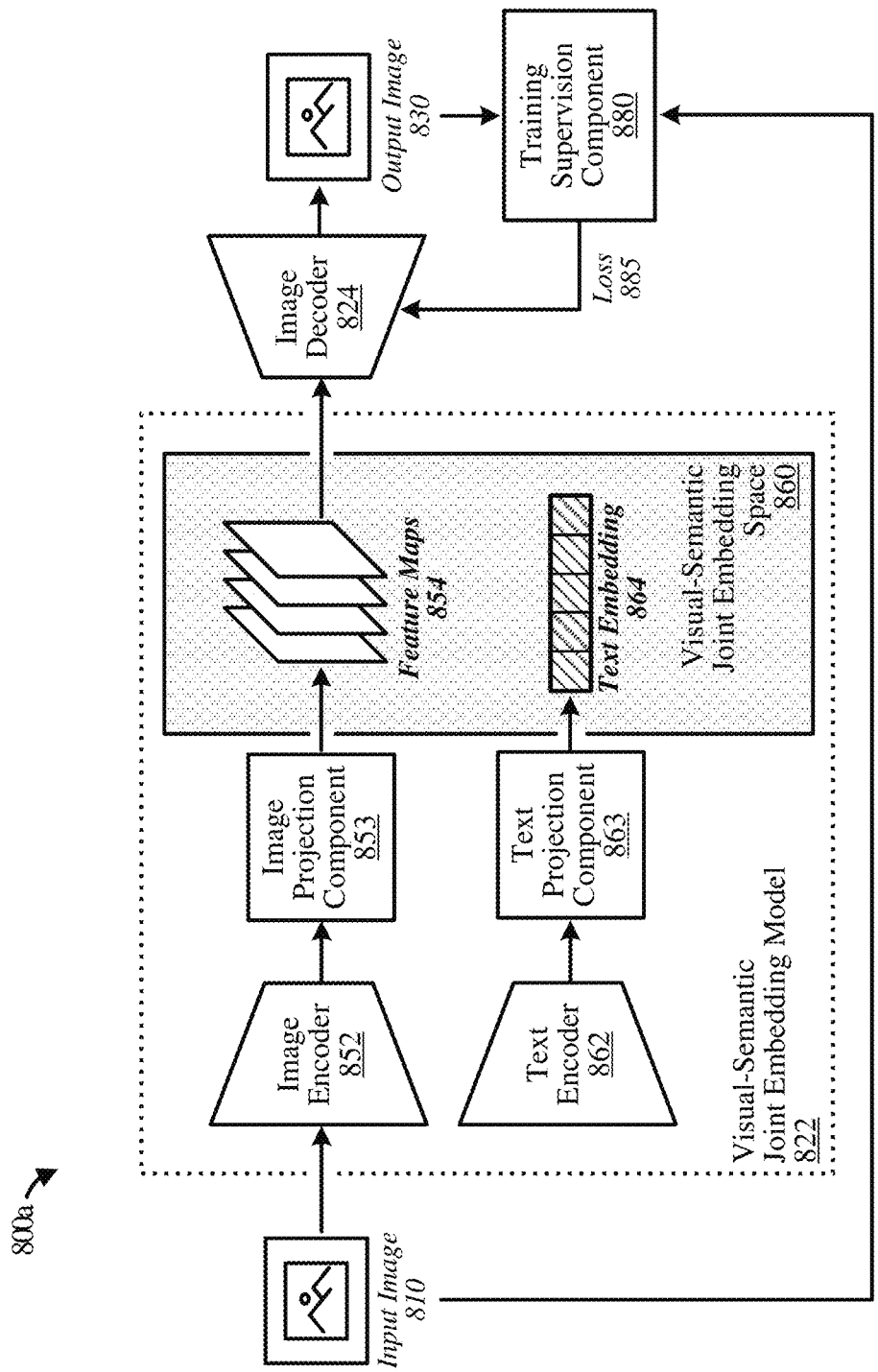
FIGS. 8A and 8B depict block diagrams illustrating example image training frameworks and for supervised training of an image decoder for decoding (or constructing) new images from image feature maps, according to some implementations.
Figure 8B:
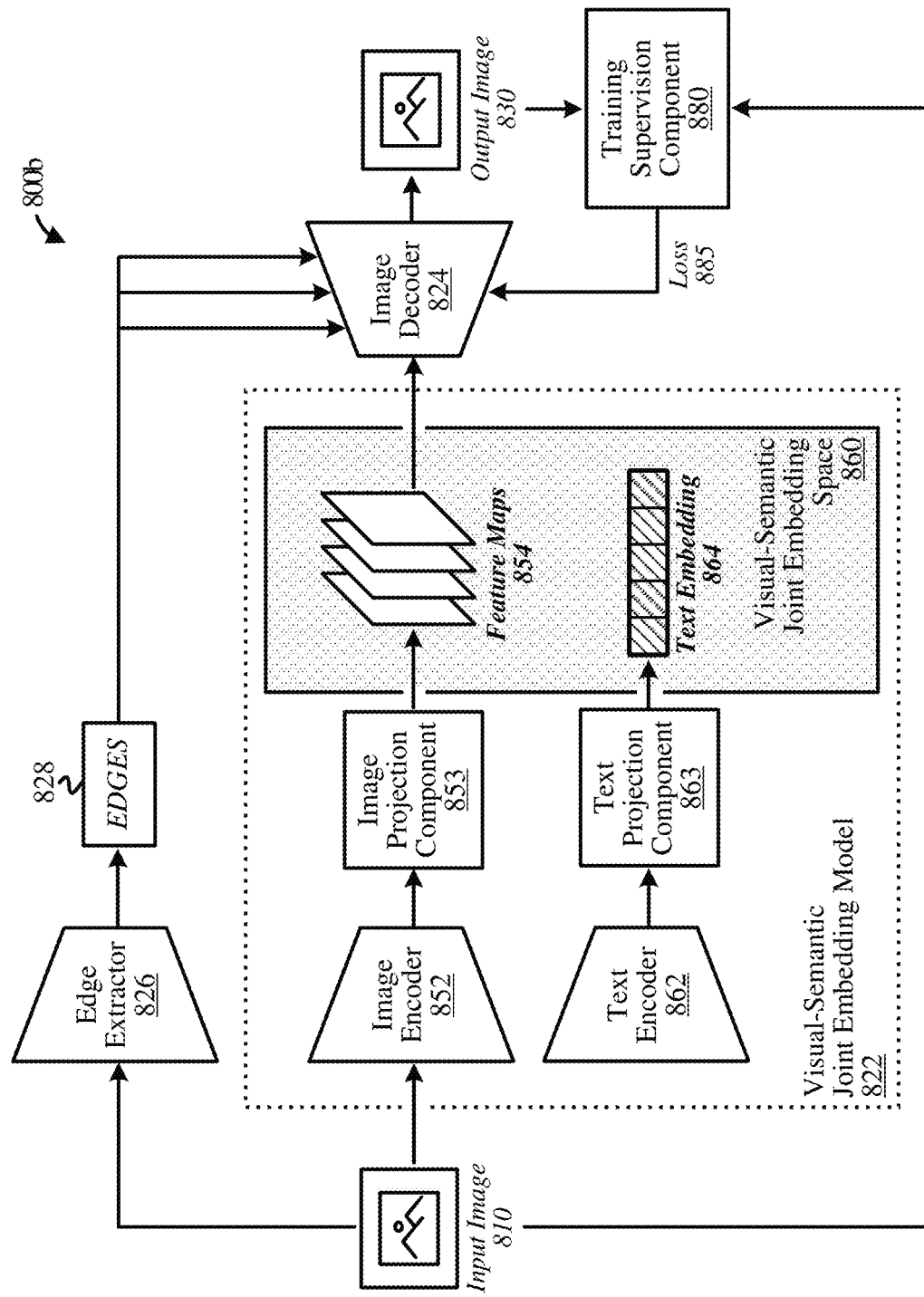

FIGS. 8A and 8B depict block diagrams illustrating example image training frameworks 800a and 800b for supervised training of an image decoder for decoding (or constructing) new images from image feature maps, according to some implementations. More specifically, example image training frameworks 800a and 800b illustrate training an image decoder 124 to decode (or construct) image feature maps in the visual-semantic embedding space into a new output image 830 without an edge extractor and with an edge extractor for preserving details of input images by introducing edge constraints, respectively.

The functions represented by the components, modules, managers and/or engines described with reference to FIG. 8A can be implemented individually or in any combination thereof, partially or wholly, in hardware, software, or a combination of hardware and software. Additionally, although illustrated as discrete components, the operation and functionality of the components, modules, managers and/or engines described with reference to FIG. 8A can be, partially or wholly, integrated within other components of a semantic image manipulation agent such as, for example, image manipulation framework 100a or 100b of FIGS. 1A and 1B, respectively, or one or more processors, modules, engines, or components associated therewith.

As shown in the example of FIGS. 8A and 8B, the image training frameworks 800a and 800b include an input image 810, a fixed (or trained) visual-semantic joint embedding model 822, an image decoder 824 being trained, an output image 830, and a training supervision component 880. The visual-semantic joint embedding model 822 includes an image encoder 852, an image projection component 853, a text encoder 862, a text projection component 863 and the visual-semantic joint embedding space 860. Other components or modules are also possible. The visual-semantic joint embedding model 822 can be visual-semantic joint embedding model 122 of FIG. 1A or 1B or visual-semantic joint embedding model 200 of FIG. 2, although alternative configurations are possible. Likewise, image decoder 824 can be image decoder 124 of FIG. 1A or 1B, although alternative configurations are possible.

To train the image decoder 824 for decoding (or constructing) new images from image feature maps, the example image training framework 800a feeds an input image 810 to the visual-semantic joint embedding model 822. As discussed herein, the visual-semantic joint embedding model 822 generates image feature maps 854 in the visual-semantic joint embedding space 860. Once generated, the image feature maps 854 are fed to the image decoder 824 which, in turn, decodes (or constructs) an output image 830.

During the image decoder training process, the output image 830 comprises a reconstructed version of the input image 810.

The training supervision component 880 compares the input image 810 and the output image 830 to calculate an image construction loss value or loss 885. The loss 885 (or signaling generated based on the loss 885) are then fed back to the decoder 824 for training, e.g., to adjust one or parameters of the image decoder 824 in an attempt to replicate input image 810 as closely as possible (or with as little loss as possible) during future image reconstructions. In some implementations, the loss 885 is a weighted sum of multiple losses, e.g., GAN loss, perceptual loss, discriminator feature matching loss, etc. An example illustrating the weighted sum is shown and discussed in greater detail with reference to FIG. 9.

The example of FIG. 8B is similar to the example of FIG. 8A but further includes an edge extractor 826 for preserving details of the input image 810 by introducing edge constraints (or edges 828). In some implementations, the edge extractor 826 extracts edge information (or edges 828) from the original input image 810 and feeds the edge information (or edges 828) to the image decoder 824 with a spatially conditioned batch normalization layer. As discussed herein, the edge extractor 826 can be a neural network-based edge extractor, a Sobel edge extractor, or some other type of edge extractor, including combinations or variations thereof.

Figure 9:
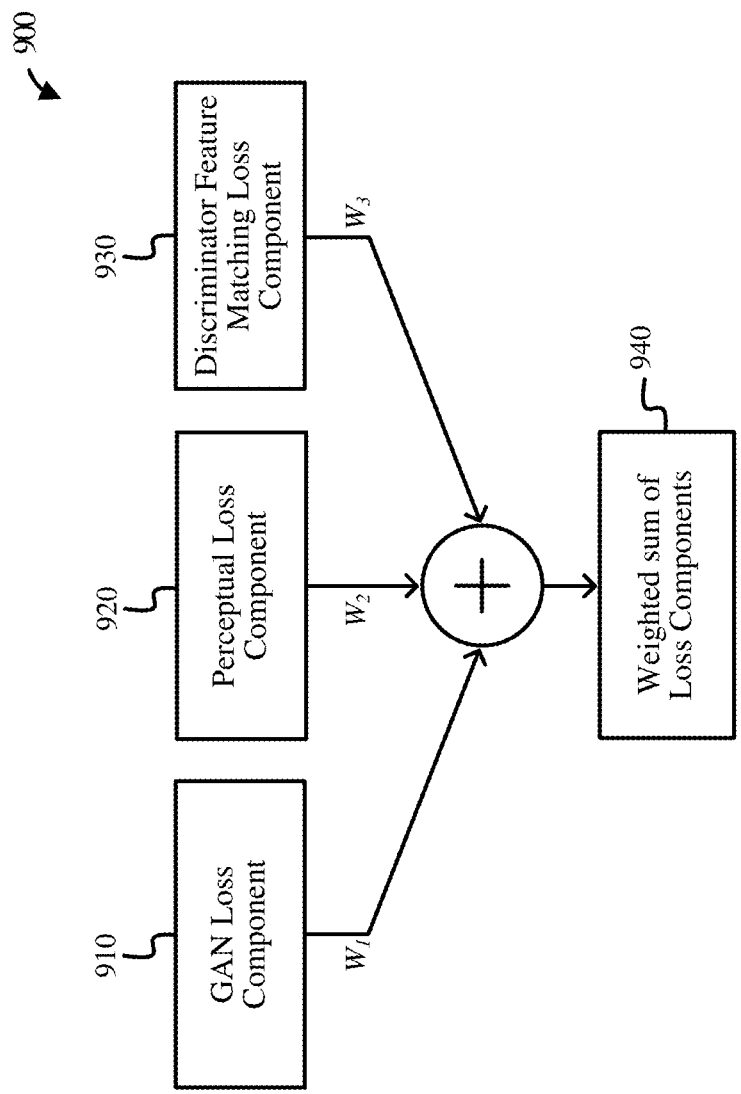
FIG. 9 depicts a block diagram illustrating example operations of a training supervision component for calculating a loss for training an image decoder, according to some implementations.

FIG. 9 depicts a block diagram illustrating example operations 900 of a training supervision component for calculating a loss for training an image decoder, according to some implementations. More specifically, the example of FIG. 9 illustrates example operations of a training component such as, for example, training component 880 of FIG. 8, for calculating a total loss by combining a GAN loss component 910, a perceptual loss component 920, and a discriminator feature matching loss component 930. As discussed herein, the total loss can have alternative configurations. Additionally, in some implementations, weights can be provided or adjusted to afford more or less weight to any of the individual components.

Figure 10:
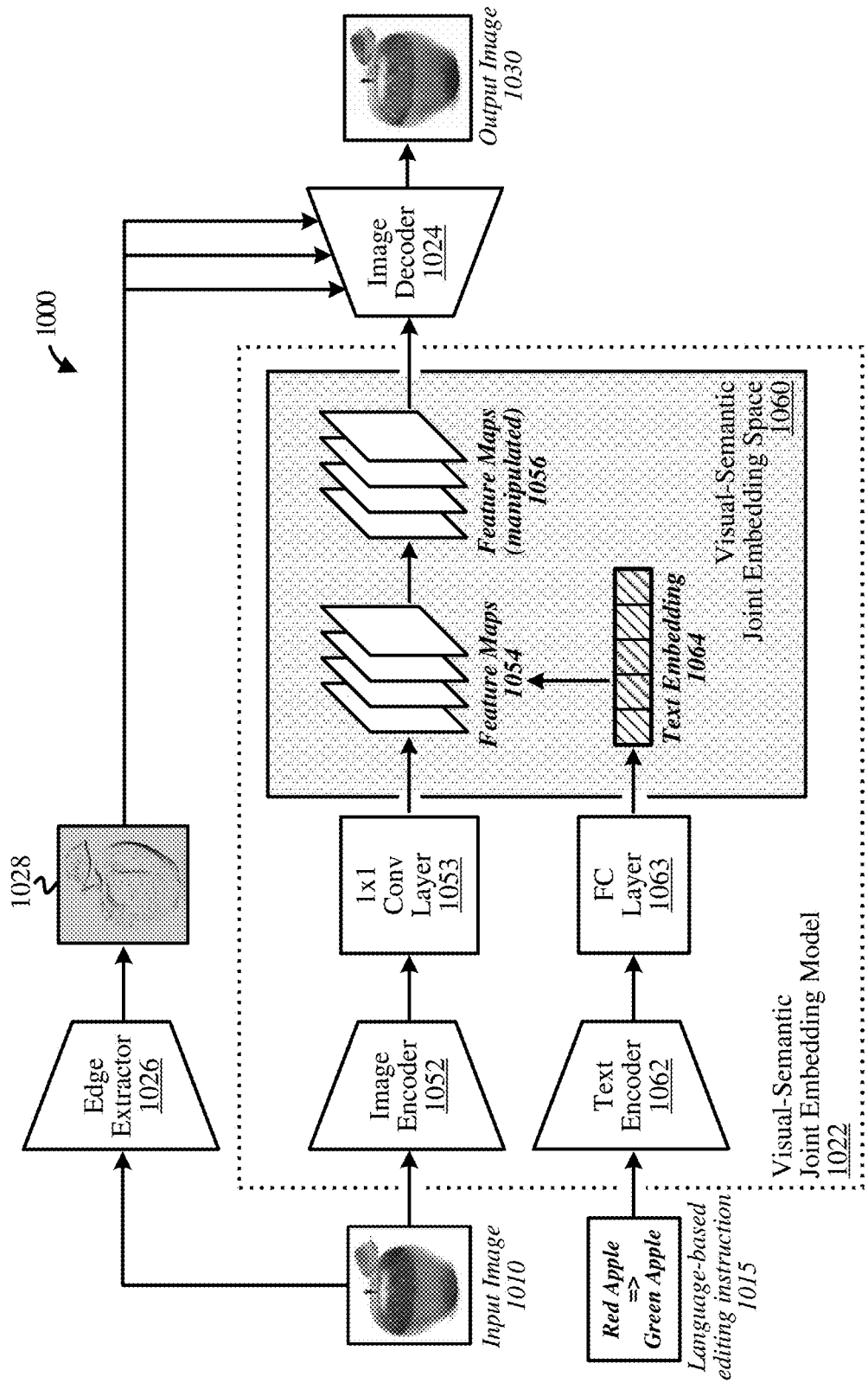
FIG. 10 depicts a block diagram illustrating components of an example image manipulation agent for open-vocabulary, unsupervised semantic image manipulation using visual-semantic joint embeddings, according to some implementations.

FIG. 10 depicts a block diagram illustrating components of an example image manipulation agent 1000 for open-vocabulary, unsupervised semantic image manipulation using visual-semantic joint embeddings, according to some implementations. The functions represented by the components, modules, managers and/or engines described with reference to FIG. 10 can be implemented individually or in any combination thereof, partially or wholly, in hardware, software, or a combination of hardware and software. Additionally, although illustrated as discrete components, the operation and functionality of the components, modules, managers and/or engines described with reference to FIG. 10 can be, partially or wholly, integrated within other components of the semantic image manipulation agent 120a of FIG. 1A or the semantic image manipulation agent 120b of FIG. 1B, although alternative configurations are possible.

As illustrated in the example of FIG. 10, the image manipulation agent 1000 includes a visual-semantic joint embedding model 1022 and an image decoder 1024. The visual-semantic joint embedding model 1022 can be image decoder 124 of FIG. 1A or 1B, although alternative configurations are possible. Likewise, image decoder 1024 can be image decoder 124 of FIG. 1A or 1B, although alternative configurations are possible. The visual-semantic joint embedding model 1022 includes an image encoder 1052, a one-by-one convolution layer 1053, a text encoder 1062, a fully connected (FC) layer 1063, and a visual-semantic joint embedding space 1060. Other components or modules are also possible.

The input image 1010 comprises an illustration of a red apple on a white background. The language-based editing instruction 1015 identifies a modification to a visual attribute (or feature) of the input image 1010. More specifically, the language-based editing instruction 1015 comprises the instruction: "red apple=>green apple."

The input image 1010 and the language-based editing instruction 1015 are fed to the visual-semantic joint embedding model 1022. The image encoder 1052 encodes the input image 1010 into image feature maps 1054 which are projected into the visual-semantic joint embedding space 1060 using a one-by-one convolution layer 1053. In some implementations, the image encoder 1052 may be represented by or utilize a CNN to encode the input image 1010 into the image feature maps 1054. The text encoder 1062 encodes the language-based editing instruction 1015 into textual feature vectors which are projected as text embeddings 1064 into the visual-semantic joint embedding space 1060 by the FC layer 1063.

As discussed herein, the visual-semantic joint embedding model 1022 manipulates the feature maps 1054 based on the text embedding 1064 resulting in modified (or manipulated) feature maps 1056. In this manner, the visual-semantic joint embedding model 1022 is able to semantically modify a visual attribute (or feature) of the input image 110 within the visual-semantic joint embedding space 1060. The modified (or manipulated) feature maps 1056 and the are then provided to decoder 1024.

The input image 1010 is also fed to the edge extractor 1026 to extract edge information (or edges 1028) of the input image 1010. In some implementations, the edge extractor 1026 can be a neural network-based edge extractor, a Sobel edge extractor, etc. Once extracted, the edge extractor 1026 is further configured to feed the edge information (or edges 1028) to the image decoder 1024. In some implementations, the edge extractor 1026 extracts edge information (or edges 1028) of the input image 1010 to feed the edge information (or edges 1028) to the image decoder 1024 with a spatially conditioned batch normalization layer.

The image decoder 1024 receives the modified (or manipulated) feature maps 1056 and the edge information (or edges 1028) and decodes (or constructs) output image 1030. As discussed herein the output image 1030 is a version of the input image 1010 that is manipulated based on text relevant attributes (or features) identified in the language-based editing instruction 1015 without manipulation (or changes) to text-irrelevant features of the input image 1010 that are not identified in the language-based editing instruction 1015. Indeed, the output image 1030 is a green apple on a white background.

Figure 11:
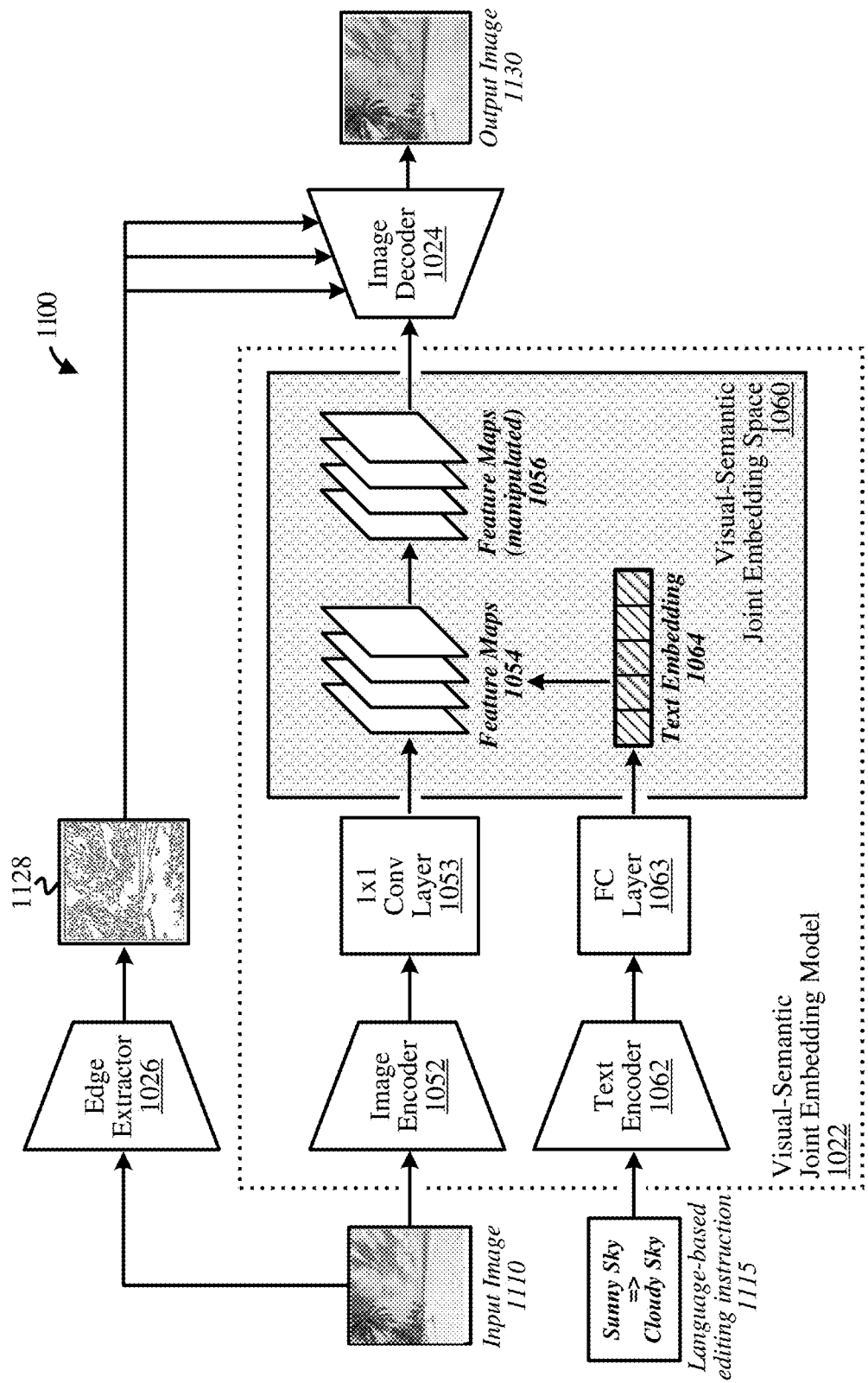
FIG. 11 depicts a block diagram illustrating components of an example image manipulation agent for open-vocabulary, unsupervised semantic image manipulation using visual-semantic joint embeddings, according to some implementations.

FIG. 11 depicts a block diagram illustrating components of an example image manipulation agent 1100 for open-vocabulary, unsupervised semantic image manipulation using visual-semantic joint embeddings, according to some implementations. The functions represented by the components, modules, managers and/or engines described with reference to FIG. 11 can be implemented individually or in any combination thereof, partially or wholly, in hardware, software, or a combination of hardware and software. Additionally, although illustrated as discrete components, the operation and functionality of the components, modules, managers and/or engines described with reference to FIG. 11 can be, partially or wholly, integrated within other components of the semantic image manipulation agent 120a of FIG. 1A or the semantic image manipulation agent 120*b* of FIG. 1B, although alternative configurations are possible.

The example components of image manipulation agent 1100 are the same as image manipulation agent 1000 of FIG. 10. However, the example of FIG. 11 illustrates feeding the image manipulation agent an input image 1110 that depicts an illustration of a sunny beach image. The language-based editing instruction 1115 identifies a modification to a visual attribute (or feature) of the input image 1110. More specifically, the language-based editing instruction 1115 comprises the instruction: "sunny sky=>cloudy sky."

FIG. 12 illustrates computing system 1201 that is representative of any system or collection of systems in which the various processes, programs, services, and scenarios disclosed herein may be implemented. Examples of computing system 1201 include, but are not limited to, server computers, cloud computing platforms, and data center equipment, as well as any other type of physical or virtual server machine, container, and any variation or combination thereof. Other examples include desktop computers, laptop computers, table computers, Internet of Things (IoT) devices, wearable devices, and any other physical or virtual combination or variation thereof.

Computing system 1201 may be implemented as a single apparatus, system, or device or may be implemented in a distributed manner as multiple apparatuses, systems, or devices. Computing system 1201 includes, but is not limited to, processing system 1202, storage system 1203, software 1205, communication interface system 1207, and user interface system 1209 (optional). Processing system 1202 is operatively coupled with storage system 1203, communication interface system 1207, and user interface system 1209.

Processing system 1202 loads and executes software 1205 from storage system 1203. Software 1205 includes and implements process 1206, which is representative of the processes discussed with respect to the preceding Figures. When executed by processing system 1202 to provide packet rerouting, software 1205 directs processing system 1202 to operate as described herein for at least the various processes, operational scenarios, and sequences discussed in the foregoing implementations. Computing system 1201 may optionally include additional devices, features, or functionality not discussed for purposes of brevity.

Continuing with the example of FIG. 12, processing system 1202 may comprise a micro-processor and other circuitry that retrieves and executes software 1205 from storage system 1203. Processing system 1202 may be implemented within a single processing device but may also be distributed across multiple processing devices or sub-systems that cooperate in executing program instructions. Examples of processing system 1202 include general purpose central processing units, graphical processing units, application specific processors, and logic devices, as well as any other type of processing device, combinations, or variations thereof.

Storage system 1203 may comprise any computer readable storage media readable by processing system 1202 and capable of storing software 1205. Storage system 1203 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 1203 may also include computer readable communication media over which at least some of software 1205 may be communicated internally or externally. Storage system 1203 may be implemented as a single storage device but may also be implemented across multiple storage devices or sub-systems co-located or distributed relative to each other. Storage system 1203 may comprise additional elements, such as a controller, capable of communicating with processing system 1202 or possibly other systems.

Software 1205 (including learning process 1206) may be implemented in program instructions and among other functions may, when executed by processing system 1202, direct processing system 1202 to operate as described with respect to the various operational scenarios, sequences, and processes illustrated herein. For example, software 1205 may include program instructions for implementing a reinforcement learning process to learn an optimum scheduling policy as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1205 may include additional processes, programs, or components, such as operating system software, virtualization software, or other application software. Software 1205 may also comprise firmware or some other form of machine-readable processing instructions executable by processing system 1202.

In general, software 1205 may, when loaded into processing system 1202 and executed, transform a suitable apparatus, system, or device (of which computing system 1201 is representative) overall from a general-purpose computing system into a special-purpose computing system customized to provide motion learning. Indeed, encoding software 1205 on storage system 1203 may transform the physical structure of storage system 1203. The specific transformation of the physical structure may depend on various factors in different implementations of this description. Examples of such factors may include, but are not limited to, the technology used to implement the storage media of storage system 1203 and whether the computer-storage media are characterized as primary or secondary storage, as well as other factors.

For example, if the computer readable storage media are implemented as semiconductor-based memory, software 1205 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1207 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 1201 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. One or more non-transitory computer readable storage media having a semantic image manipulation agent stored thereon, the semantic image manipulation agent including program instructions that, when executed by one or more processors, direct the one or more processors to:
  encode a language-based editing instruction into textual feature vectors, wherein the language-based editing instruction identifies a modification to a visual attribute of an input image;
  embed the textual feature vectors into a visual-semantic joint embedding space;
  manipulate an image feature map corresponding to the input image based on the textual feature vectors to generate a manipulated image feature map that represents of the input image with the modification within the visual-semantic joint embedding space;
  decode edge information extracted from the input image to determine one or more modulation parameters; and
  construct a new image from the manipulated image feature map and the one or more modulation parameters.

2. The one or more non-transitory computer readable storage media of claim 1, wherein the program instructions, when executed by the one or more processors, further direct the one or more processors to:
  project an edge map corresponding to the edge information onto an embedding space;
  convolve the edge map to determine the one or more modulation parameters; and
  construct the new image by combining the one or more modulation parameters with the manipulated image feature map.

3. The one or more non-transitory computer readable storage media of claim 1, wherein the program instructions, when executed by the one or more processors, further direct the one or more processors to construct the new image by decoding, using an image decoder, the manipulated image feature map and the edge information.

4. The one or more non-transitory computer readable storage media of claim 1, wherein the program instructions, when executed by the one or more processors, further direct the one or more processors to:
  encode the input image into the image feature map; and
  embed the image feature map into the visual-semantic joint embedding space.

5. The one or more non-transitory computer readable storage media of claim 1, wherein the program instructions, when executed by the one or more processors, pre-train a visual-semantic joint embedding model for semantic-based image manipulation by further directing the one or more processors to:
  feed an image-caption pair to the visual-semantic joint embedding model, wherein the image-caption pair includes a training image and a corresponding caption describing the training image;
  encode the training image into a training image feature map;
  perform an average pooling operation on the training image feature map to generate a training visual feature vector;
  encode the caption describing the training image into a training textual feature vector;
  normalize the training visual feature vector and the training textual feature vector;
  calculate a matching score that indicates a similarity between the normalized training visual feature vector and the normalized training textual feature vector; and
  iteratively train, utilizing a supervised learning operation, the visual-semantic joint embedding space based on the matching score.

6. The one or more non-transitory computer readable storage media of claim 5, wherein the program instructions, when executed by the one or more processors, train an image decoder by further directing the one or more processors to:
  feed a second training image to the pre-trained visual-semantic joint embedding model;
  encode the second training image into a second training image feature map;
  embed the second training image feature map into the visual-semantic joint embedding space;
  reconstruct, using the image decoder, the second training image based on the second training image feature map;
  determine a loss by comparing the second training image to the reconstructed second training image; and
  feed the loss to the image decoder for training.

7. The one or more non-transitory computer readable storage media of claim 6, wherein to determine the loss, the program instructions, when executed by the one or more processors, further direct the one or more processors to calculate a weighted sum of GAN loss, perceptual loss, and discriminator feature matching loss.

8. The one or more non-transitory computer readable storage media of claim 1, wherein the textual feature vectors comprise:
a first textual feature vector corresponding to the visual attribute, and
a second textual feature vector corresponding to the modification to the visual attribute.

9. The one or more non-transitory computer readable storage media of claim 8, wherein the program instructions, when executed by the one or more processors, further direct the one or more processors to generate the manipulated image feature map using a manipulation rule to replace the visual attribute of the input image identified by the first textual feature vector with the modification to the visual attribute identified by the second textual feature vector.

10. A method comprising:
receiving an input image to be manipulated and a language-based editing instruction identifying a modification to a visual attribute of the input image;
encoding, using an image encoder, the input image into an image feature map;
encoding, using a text encoder, the language-based editing instruction into textual feature vectors including:
a first textual feature vector corresponding to the visual attribute, and
a second textual feature vector corresponding to the modification to the visual attribute;
embedding the image feature map and the textual feature vectors into a visual-semantic joint embedding space;
generating a new image feature map that represents the input image with the modification by manipulating the image feature map using the textual feature vectors within the visual-semantic joint embedding space;
decoding edge information extracted from the input image to determine one or more modulation parameters; and
constructing, using an image decoder, a new image from the new image feature map and the one or more modulation parameters.

11. The method of claim 10, further comprising:
extracting, using an edge extractor, the edge information from the input image; and
feeding the edge information to the image decoder to determine the one or more modulation parameters.

12. The method of claim 10, further comprising pre-training a visual-semantic joint embedding model for semantic-based image manipulation by:
feeding an image-caption pair to the visual-semantic joint embedding model, wherein the image-caption pair includes a training image and a corresponding caption describing the training image;
encoding, using the image encoder, the training image into a training image feature map;
performing an average pooling operation on the training image feature map to generate a training visual feature vector;
encoding, using the text encoder, the caption describing the training image into a training textual feature vector;
normalizing the training visual feature vector and the training textual feature vector;
calculating a matching score that indicates a similarity between the normalized training visual feature vector and the normalized training textual feature vector; and
using the matching score to iteratively train the visual-semantic joint embedding space.

13. The method of claim 12, further comprising training the image decoder by:
encoding a second training image into a second training image feature map;
embedding the second training image feature map into the visual-semantic joint embedding space;
reconstructing, using the image decoder, the second training image based on the second training image feature map;
determining a loss by comparing the second training image to the reconstructed second training image; and
feeding the loss to the image decoder for training.

14. The method of claim 13, wherein determining the loss comprises calculating a weighted sum of GAN loss, perceptual loss, and discriminator feature matching loss.

15. The method of claim 10, wherein generating the new image feature map comprises using a manipulation rule to replace the visual attribute of the input image identified by the first textual feature vector with the modification to the visual attribute identified by the second textual feature vector.

16. A computer system comprising one or more processors and memory configured to provide computer program instructions to the one or more processors, the computer program instructions comprising:
an image encoder configured to direct the one or more processors to encode an input image into an image feature map;
an image projection component configured to direct the one or more processors to embed the image feature map into a visual-semantic joint embedding space;
a text encoder configured to direct the one or more processors to encode a language-based editing instruction into textual feature vectors, wherein the language-based editing instruction identifies a modification to a visual attribute of the input image;
a text projection component configured to direct the one or more processors to embed the textual feature vectors into the visual-semantic joint embedding space;
a visual-semantic joint embedding component configured to direct the one or more processors to manipulate the image feature map to generate a manipulated image feature map that represents the input image with the modification within the visual-semantic joint embedding space; and
an image decoder configured to direct the one or more processors to:
decode edge information extracted from the input image to determine one or more modulation parameters; and
decode the manipulated image feature map in the visual-semantic embedding space and the one or more modulation parameters into a new image.

17. The computer system of claim 16, further comprising an edge extractor configured to direct the one or more processors to:
extract the edge information from the input image, and
feed the edge information to the image decoder.

18. The computer system of claim 17, wherein the edge extractor comprises a neural network-based edge extractor or Sobel edge extractor.

19. The computer system of claim 16, wherein the text encoder comprises a long-short-term-memory network (LSTM).

20. The computer system of claim 16, wherein the image encoder comprises a convolutional neural network.

* * * * *

UNITED STATES PATENT AND TRADEMARK OFFICE
CERTIFICATE OF CORRECTION

PATENT NO. : 11,574,142 B2
APPLICATION NO. : 16/943511
DATED : February 7, 2023
INVENTOR(S) : Zhe Lin et al.

Page 1 of 1

It is certified that error appears in the above-identified patent and that said Letters Patent is hereby corrected as shown below:

In the Claims

Column 19, Line 64:
In Claim 1, after "represents" delete "of".

Signed and Sealed this
Fourth Day of April, 2023

Katherine Kelly Vidal
*Director of the United States Patent and Trademark Office*